(12) United States Patent
Charney et al.

(10) Patent No.: US 6,990,356 B2
(45) Date of Patent: Jan. 24, 2006

(54) CORDLESS TELEPHONE SYSTEM WITH WIRELESS EXPANSION PERIPHERALS

(75) Inventors: Douglas Charney, Richmond (CA); Gordon Ryley, Calgary (CA)

(73) Assignee: VTech Telecommunications, Limited, Tai Po (HK)

( * ) Notice: Subject to any disclaimer, the term of this patent is extended or adjusted under 35 U.S.C. 154(b) by 373 days.

(21) Appl. No.: 10/338,574

(22) Filed: Jan. 8, 2003

(65) Prior Publication Data

US 2004/0132485 A1    Jul. 8, 2004

(51) Int. Cl.
 *H04M 1/00* (2006.01)

(52) U.S. Cl. .............................. 455/552.1; 455/550.1; 455/553.1; 455/465; 455/463; 455/462; 379/419; 379/440

(58) Field of Classification Search ............ 455/552.1, 455/550.1, 465, 432.1, 73, 74.1, 553.1, 463, 455/462, 419, 440
See application file for complete search history.

(56) References Cited

U.S. PATENT DOCUMENTS

| | | | | |
|---|---|---|---|---|
| 5,463,674 A | * | 10/1995 | Gillig et al. ............. | 455/552.1 |
| 5,598,412 A | * | 1/1997 | Griffith et al. ............. | 370/352 |
| 6,128,512 A | * | 10/2000 | Trompower et al. ........ | 455/561 |
| 6,226,515 B1 | * | 5/2001 | Pauli et al. ............. | 455/426.1 |
| 6,466,799 B1 | * | 10/2002 | Torrey et al. ............. | 455/462 |
| 6,490,447 B2 | * | 12/2002 | Biedermann et al. .... | 455/426.1 |
| 6,574,266 B1 | * | 6/2003 | Haartsen ..................... | 375/133 |
| 6,748,236 B1 | * | 6/2004 | Barbey et al. ........... | 455/552.1 |
| 6,847,627 B1 | * | 1/2005 | Knutson et al. ............. | 370/347 |
| 2001/0017864 A1 | * | 8/2001 | Stobart ....................... | 370/442 |
| 2001/0043572 A1 | * | 11/2001 | Bilgic et al. ................ | 370/281 |
| 2001/0055954 A1 | * | 12/2001 | Cheng ....................... | 455/74.1 |
| 2002/0072390 A1 | * | 6/2002 | Uchiyama .................... | 455/557 |
| 2002/0086687 A1 | * | 7/2002 | Kockmann et al. ......... | 455/463 |
| 2002/0102974 A1 | | 8/2002 | Ralth | |
| 2003/0003917 A1 | * | 1/2003 | Copely et al. .............. | 455/444 |
| 2003/0078071 A1 | * | 4/2003 | Uchiyama .................... | 455/557 |
| 2004/0097259 A1 | * | 5/2004 | Toor et al. ................ | 455/552.1 |

FOREIGN PATENT DOCUMENTS

| EP | 0 849 965 | 12/1996 |
|---|---|---|
| GB | GB SEARCH REPORT | 6/2004 |
| WO | WO 2004/025928 | 3/2004 |

* cited by examiner

*Primary Examiner*—Sonny Trinh
*Assistant Examiner*—Khai Nguyen
(74) *Attorney, Agent, or Firm*—Pillsbury Winthrop Shaw Pittman LLP

(57) ABSTRACT

A cordless telephone system comprising a base unit, at least one handset, and one or more expansion units is provided. The handset and the expansion units communicate with the base unit via communication channels implemented in a wireless communication protocol. The expansion units can provide the system with communication interfaces to various external networks, such as an additional analog telephone line, a digital telephone line, or a cellular telephone. Conference calling functionality is provided between handsets and expansion base units within the primary base unit. Data services can also be provided by a wireless expansion base unit.

15 Claims, 3 Drawing Sheets

CORDLESS TELEPHONE SYSTEM WITH WIRELESS EXPANSION PERIPHERALS

BACKGROUND OF THE INVENTION

1. Field of the Invention

The present invention relates generally to cordless telephone systems. In particular, the invention relates to a cordless telephone system capable of modular expansion of its features and capabilities through the addition of wireless peripherals.

2. Background Art

Cordless telephone devices have become increasingly popular among individuals both at home and in the workplace. Modern cordless telephones offer a wide range of features. While conventional cordless telephones provide a base unit which communicates with a single cordless telephone handset, many modern systems provide for expansion in the number of handsets that may be utilized with a cordless telephone base unit.

The heart of typical existing cordless telephone systems is the cordless telephone base unit. The base unit typically determines which features are provided by the cordless telephone system. Features typically dictated by the base unit include the number of telephone lines to which the system can be connected, the number of handsets that can be used, and whether ISDN telephone lines can be accessed. Some base units which have recently been discussed further include an interface to a cellular telephone. Such a base unit is described in Published U.S. Application No. 20020072390A1, assigned to Meridian Concepts L.L.C. If a user desires features that are not provided by the user's current base unit, the user typically must replace the entire cordless telephone system to upgrade to a system having the desired features.

Outside the realm of consumer cordless telephones, expandable telephone systems are known in the private branch exchange ("PBX") art. Typically such systems include a main PBX unit having a plurality of physical slots which can be optionally populated by additional line interface circuit boards to increase the capacity of the system. However, the increased size of the primary base unit caused by provision of physical expansion slots may be highly undesirable in some applications. Furthermore, extra cost is incurred by providing the connectors and other hardware required to support the electrical interfaces to potential expansion units. When expansion devices are added to such a system, they typically must be collocated with the main base unit and sometimes require expert technicians to reprogram and/or configure the modified system, limiting the flexibility of the system configuration and potentially incurring extra costs in routing multiple communications lines to the single main unit location and technical support.

SUMMARY OF THE INVENTION

The present invention provides for the addition of expansion peripherals wirelessly connected to the base unit of a cordless telephone system. In accordance with one aspect of the invention, the cordless telephone system includes a primary base unit that implements a wireless communications protocol capable of supporting simultaneous communications via a plurality of communication channels. The system further includes a cordless telephone handset capable of communicating with the primary base unit via a first communication link established using a first one of the plurality of communication channels.

An expansion base unit is also provided. The expansion base unit includes a communication interface linking the expansion base unit to an external communication network. Expansion base units can be provided to enable communication with a variety of different networks, such as networks including an analog telephone line, a digital telephone line, or a cellular telephone network. The expansion base unit communicates with the primary base unit via a second communication link established using a second one of the plurality of wireless communication channels. The system provides the cordless telephone handset with the capability of conducting communications using the external communications network to which the expansion base interfaces.

In accordance with another aspect of the invention, an expandable conference calling feature can also be implemented using the cordless handsets, the primary base unit, and any expansion peripherals that are available to the system. A radio transceiver is provided within the primary base unit which conducts wireless communications with the cordless telephone handsets and any available expansion peripherals. The audio information received by the radio transceiver is conveyed to a baseband audio processor, also within the primary base unit. The baseband audio processor is also configured to receive audio signals from a telephone line interface implemented within the primary base unit. A microcontroller is provided within the primary base unit to effect the initiation of conference calling functionality. In so doing, the baseband audio processor is configured to combine the audio signals appearing on two or more of the communication channels such that conference calling functionality is provided.

DETAILED DESCRIPTION OF THE DRAWINGS

Figure 1:
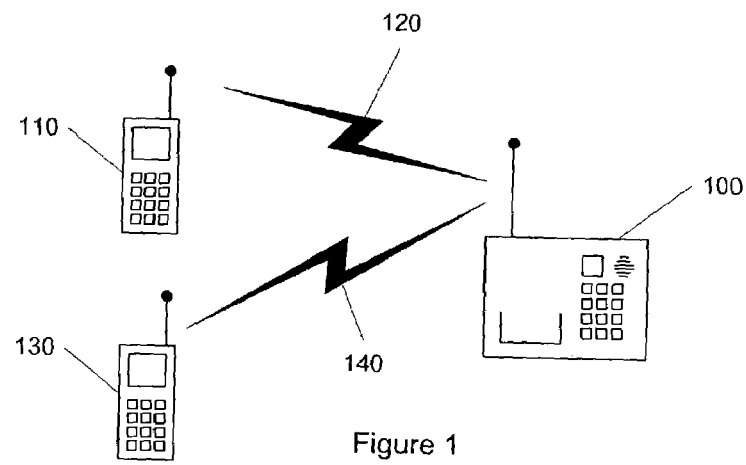
FIG. 1 is a block diagram of a prior art cordless telephone system.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

FIG. 1 illustrates a typical prior art cordless telephone system which is expandable to accommodate multiple handsets. Base unit 100 implements a multi-channel wireless communications protocol such that it is capable of communicating with cordless telephone handsets 110 and 130 via wireless communication links 120 and 140, respectively. Base unit 100 is provided with a telephone line interface for one POTS telephone line. If the owner of base unit 100 desires to implement a two-line telephone system, base unit 100 (and possibly handsets 110 and 130) typically must be replaced in their entirety with a system having a base unit with two telephone line interfaces and handsets with two-line capability.

Figure 2:
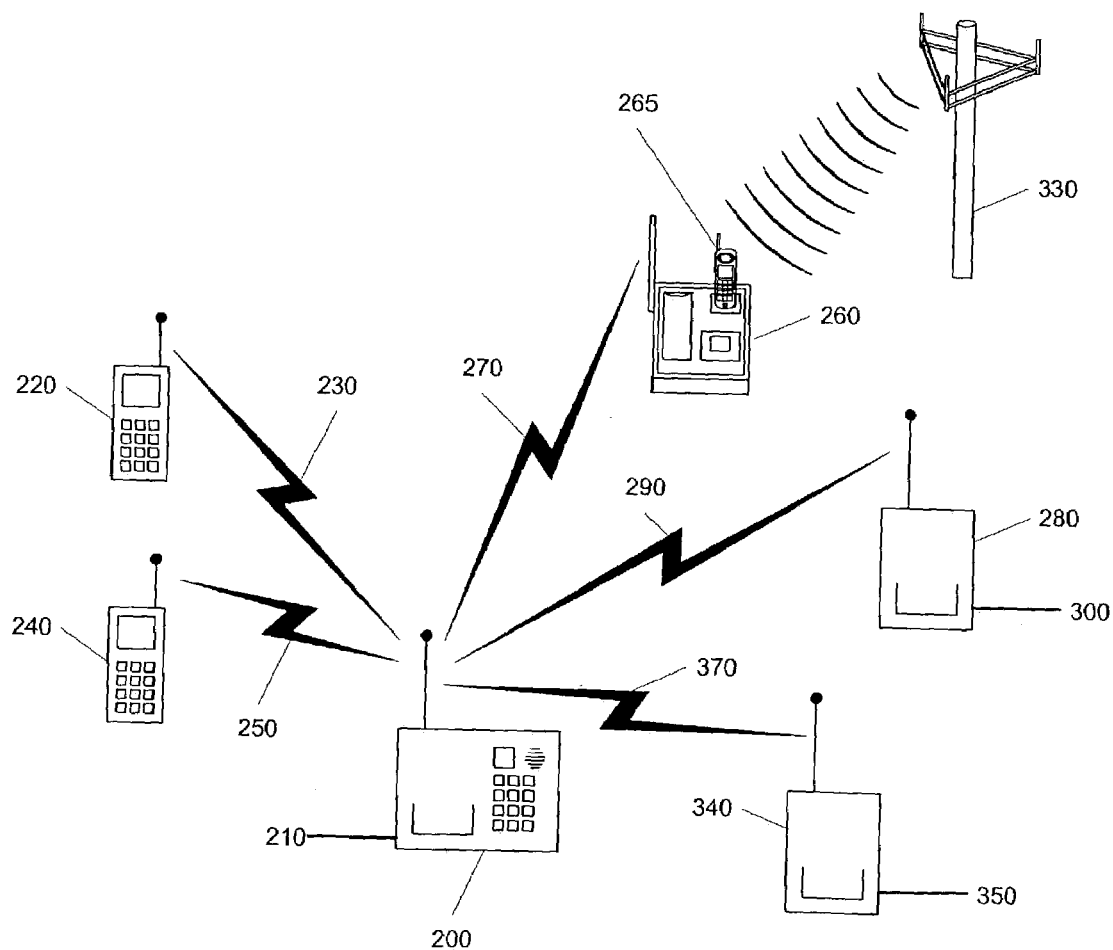
FIG. 2 is a block diagram of a cordless telephone system according to one embodiment of the present invention.

FIG. 2 illustrates a cordless telephone system in accordance with an embodiment of the present invention. Primary cordless telephone base unit 200 includes a connection to a single POTS telephone line 210. Primary base unit 200 communicates with cordless telephone handsets 220 and 240 via wireless communication links 230 and 250, respectively.

The system of FIG. 2 is further provided with the capability of adding expansion peripherals to increase the functionality of the system. The peripherals are connected to primary base unit 200 via further channels provided by the wireless communications protocol with which links 230 and 250 are implemented. Thus, the interface to expansion peripherals is accomplished primarily using electronic hardware which is already existent in the base unit. Further connectors and interconnection components need not be included in base unit 200, saving cost and reducing the physical size of the base unit.

One type of expansion peripheral provided by the system of FIG. 2 is cellular base unit 260. Cellular base unit 260 includes a cradle in which cellular telephone 265 can be placed. Cellular base 260 communicates with primary cordless base 200 via wireless communication link 270. Cellular base 260 further includes a wired interface with cellular telephone 265 when cellular telephone 265 resides in the cellular cradle, through which cellular telephone 265 can be controlled to conduct communications via cellular telephone infrastructure 330. While cellular base unit 260 is illustrated having a cradle providing physical interconnection with a cellular telephone, it is understood that other types of communication interfaces between the cellular base unit and a cellular telephone can readily be implemented. For example, an interface could be implemented using Bluetooth or infrared wireless communication capabilities of some cellular telephones.

Integration of a cellular telephone interface to a cordless telephone system via a wireless link not only provides convenient and cost-effective expandability, but also provides flexibility in the physical placement of the cellular telephone while cradled. This can be particularly important inasmuch as the quality of cellular coverage may vary substantially between various locations inside the user's residence or office. The optimum location for cellular telephone coverage may not be near a telephone jack, which is typically required for placement of a primary base unit. By integrating the cellular cradle with the cordless telephone system via wireless link 270, the user is provided with the ability to position the cellular base unit 260 in a location which provides optimum reception quality and is independent from the location of primary cordless base unit 200 and conventional telephone line 210.

In operation, a telephone call can be placed from cordless handset 220 via the cellular telephone network using the system of FIG. 2. Primary cordless base unit 200 detects the presence of cellular base unit 260 having cellular telephone 265 present and cradled. Primary cordless base 200 transmits a message to cordless handset 220 via communication link 230 indicating that a cellular interface is available for placement of a telephone call. Cordless handset 220 indicates that the cellular interface is available via its user interface. The cellular interface can then be selected, and a call can be dialed, using the cordless handset.

A sequential chain of communications is set up between handset 220, communication link 230, primary base unit 200, communication link 270, cellular base 260, and cellular telephone 265. Cellular base 260 provides the electrical interface with cellular telephone 265, whereby messages from the cordless telephone system are adapted to a signaling protocol compatible the cellular telephone interface. Cellular base 260 may further provide echo cancellation functionality that may be desirable to compensate for the additional level of delay typically found when communicating over a cellular interface. Primary cordless base unit 200 provides the communications interface with the cordless handsets present in the system, and directs signaling to the appropriate handset when an incoming call is answered or an outgoing call is placed.

Further functionality can be provided by different types of wireless expansion peripherals. For example, operation in connection with a second POTS telephone line is provided by expansion base unit 280. Expansion base unit 280 is connected to, and provides an interface for, POTS line 300. In operation, expansion base 280 transmits a signal to primary base unit 200 via communication link 290 indicating that it is present and connected to an active telephone line. Primary base unit 200 then transmits a message to handsets 220 and 240 via links 230 and 250, respectively, indicating that line 300 is available for use. The availability of line 300 is indicated by the user interface of each handset. A handset user can then select line 300 for placement of a telephone call via the handset user interface. When a telephone call is placed, expansion base 280 serves as the interface to line 300. Messaging and audio data is conveyed sequentially between expansion base 280, primary base unit 200, and the active handset.

The system of FIG. 2 further includes the ability to interface with other types of communications lines. ISDN base unit 340 provides the cordless telephone system with an interface to digital ISDN telephone line 350. ISDN base unit 340 operates analogously to expansion base unit 280, except that it provides a telephone line interface compatible with digital ISDN standards.

Figure 3:
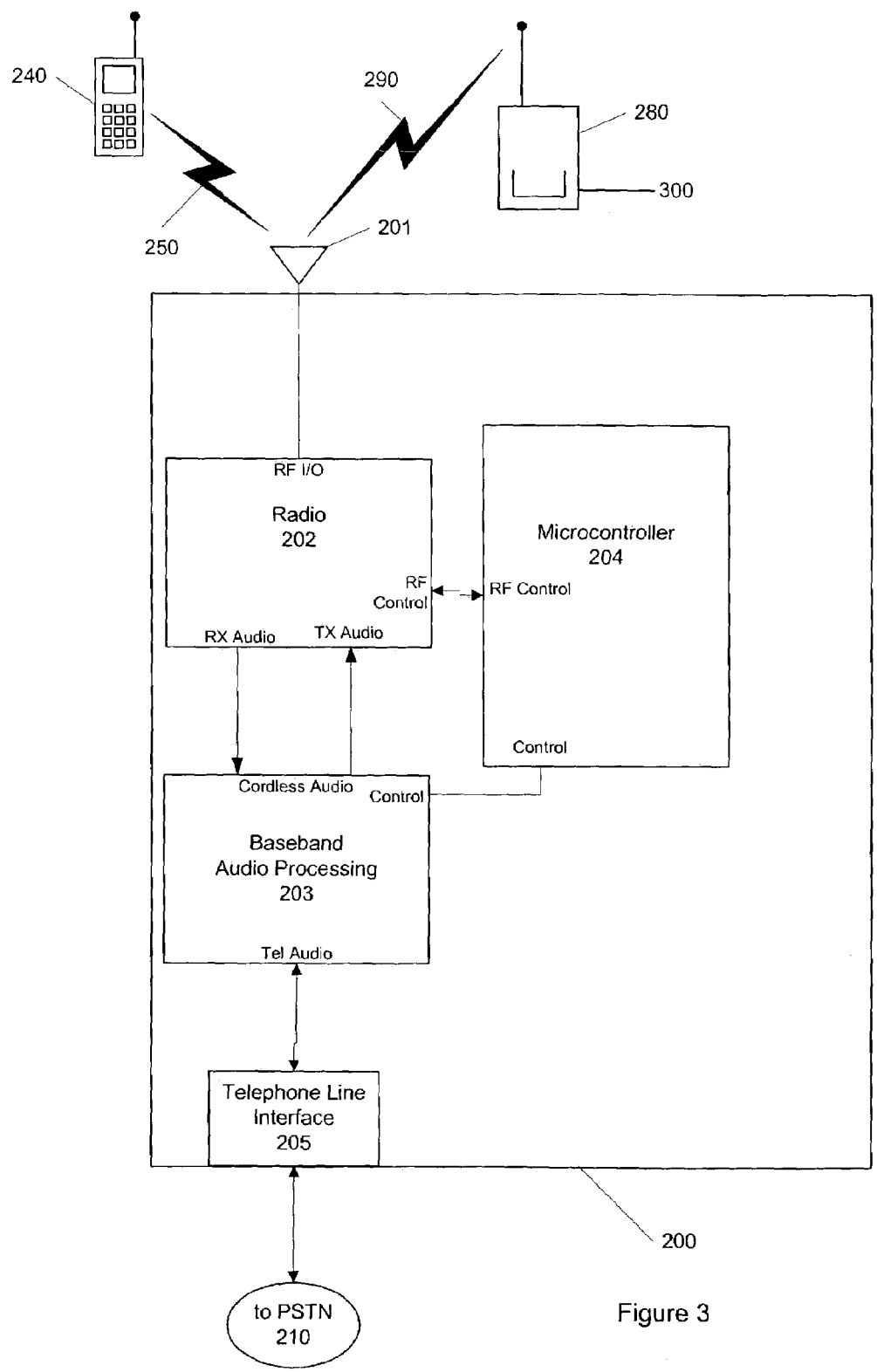
FIG. 3 is a block diagram of a cordless telephone system configuration having conference calling functionality.

By routing the wireless peripheral communications through primary cordless base unit 200, various conference calling features can be readily implemented. A conference calling arrangement according to one embodiment of the invention is illustrated in FIG. 3. Primary base unit 200 includes radio transceiver 202 capable of simultaneous communication over communication links 250 and 290. Such multi-channel communications systems are known in the art. For example, the system of FIGS. 2 and 3 could be implemented using the DECT communications standard. Each of communication links 230, 250, 270, 290 and 370 could be implemented using a separate time slot on a DECT communications channel.

During a conference call operation, the audio signals corresponding to each communication channel involved in the conference can be combined within primary base unit 200. Specifically, radiofrequency signals received at antenna 201 are conveyed to transceiver 202. Baseband audio information is further conveyed from transceiver 202 to baseband audio processor 203. Base unit 200 further includes telephone line interface 205, connected to telephone line 210. Baseband audio processor 203 is further configured to communicate audio information to and from telephone line interface 205.

A conference call can be set up by handset 240 according to user interface operations known in the art. Control data initiating the conference call is conveyed via communication link 250 to transceiver 202 and to microcontroller 204. Microcontroller 204 configures primary base unit 200 to implement the conference calling operation. In so doing, baseband audio processor 203 is configured to combine the audio signals from telephone line interface 205, as well as the audio signals on communication links 250 and 290 received via transceiver 202. In this way, handset 240, expansion base unit 280 connected to external network 300, and telephone line 210 can all be readily combined to implement three-way conference calling functionality. Furthermore, the conference calling capability of the cordless telephone system can be further expanded to include any additional expansion peripherals that are present in the system up to the maximum number of peripherals which the radio interface of primary base unit 200 is capable of supporting simultaneously, without substantive changes in the base unit hardware.

Figure 4:
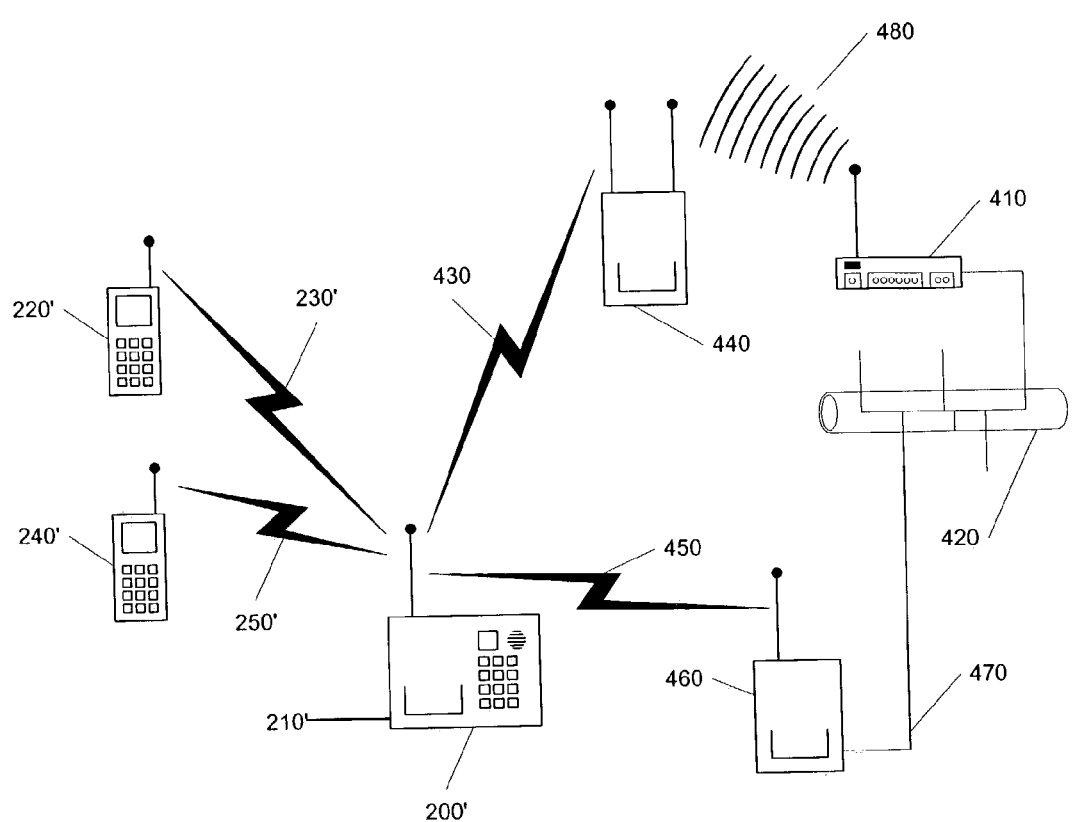
FIG. 4 is a block diagram of a cordless telephone system configuration providing data services.

The present invention can also be employed to provide data services to the cordless telephone system via a wireless expansion peripheral. Many cordless telephone communication protocols, such as DECT, provide for the implementation of data services. FIG. 4 illustrates a cordless telephone system arrangement whereby the data services are provided through a wireless expansion peripheral, such that the data services can be added to a cordless telephone system centered around a primary base unit that lacks a data network interface circuit. Elements of FIG. 4 having a prime (') following their reference numerals are analogous to the elements of the preceding drawings having the same number without a prime ('). Network expansion base unit 460 provides a data network adapter connected to local area network ("LAN") 470. Data communications received from LAN 470 by expansion base unit 460 are conveyed to primary base unit, 200'. Such data communications can then be relayed to the cordless telephone handsets, as appropriate for a desired data application. While network expansion base unit 470 is illustrated as communicating via an ethernet-type data connection, it is understood that other data connections could also be readily provided by wireless expansion base units in accordance with the invention, such as a broadband cable data network interface or DSL.

Data services can also be provided by the cordless telephone system of FIG. 4 via a wireless data network, such as a wireless LAN 480 implemented using the IEEE 802.11 ("Wi-Fi") wireless networking protocol. Wi-Fi base unit 440 includes a Wi-Fi transceiver capable of communicating with access point 410. Access point 410 is interconnected with wired LAN 420. Data can be relayed between access point 410, wireless LAN 480, Wi-Fi expansion base unit 440, communication link 430, primary base unit 200', and cordless handsets 220' and/or 240' via links 230' and/or 250', respectively. In this way, access to wireless LAN 480 is provided to enable implementation of data services within the cordless telephone system, without requiring the provision of a data network interface in primary base unit 200'.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. A cordless telephone system comprising:
    a primary cordless telephone base unit coupled to a primary communications network and implementing a wireless communication protocol capable of supporting simultaneous communications via a plurality of wireless communications channels;
    a cordless telephone handset;
    a first communication link between the handset and the primary cordless telephone base unit, the communication link being established using a first one of the plurality of wireless communication channels;
    an expansion base unit, the expansion base unit comprising a first communication interface linking the expansion base unit to an external communication network, and a second communication interface compatible with the wireless communication protocol;
    a second communication link between the primary cordless telephone base unit and the second communication interface of the expansion base unit, the communication link being established using a second one of the plurality of wireless communication channels;
    whereby the cordless telephone system transmits voice information between the cordless telephone handset and the expansion base unit via the first communication link, the primary cordless telephone base unit, and the second communication link.

2. The cordless telephone system of claim 1, in which the expansion base unit first communication interface is comprised of an analog telephone line interface; whereby the cordless telephone handset can place or receive telephone calls via the expansion base analog telephone line.

3. The cordless telephone system of claim 1, in which the expansion base unit first communication interface is comprised of a cellular telephone interface adapted for communications with a cellular telephone; and the external communication network to which the expansion base unit is linked comprises a cellular telephone network; whereby the cordless telephone handset is capable of placing and receiving calls via the expansion base unit and the cellular telephone network when the cellular telephone is engaged with the cellular telephone interface.

4. The cordless telephone system of claim 1, in which the expansion base unit first communication interface is comprised of a digital telephone line interface; whereby the cordless handset can place or receive telephone calls via the expansion base digital telephone line.

5. The cordless telephone system of claim 1, in which the expansion base unit first communication interface is comprised of a digital data network interface configured to communicate with a data network; whereby digital data services can be provided to the cordless handset via the expansion base unit and the data network.

6. The cordless telephone system of claim 5, in which the first communication interface is comprised of a wireless digital data network interface configured to communicate with a wireless access point, whereby digital data services can be provided to the cordless telephone handset via the expansion base unit and the wireless data network.

7. The cordless telephone system of claims 1, in which the primary base unit is further comprised of:
    a primary telephone line interface adapted for communications via a primary telephone line;
    a radio transceiver adapted to conduct simultaneous communications via the first communication link and the second communication link;
    a baseband audio processor configured to combine audio signals received from the radio transceiver and the primary telephone line interface; whereby conference calling can be implemented between the cordless handset, the external communication network to which the expansion base unit is connected, and the primary telephone line interface.

8. A cordless telephone system comprising:
    a primary cordless telephone base unit implementing a wireless communication protocol capable of supporting simultaneous communications via a plurality of wireless communication channels;

one or more cordless telephone handsets, each cordless telephone handset having a wireless communication link with the primary base unit implemented using the wireless communication protocol;

one or more expansion base units, the expansion base units each comprising an expansion communication interface linking the expansion base unit to an external communication network, and a wireless communication link with the primary base unit using the wireless communication protocol;

the primary cordless telephone base unit being further comprised of:

a radio transceiver capable of conducing simultaneous communications with each of the one or more handsets and the one or more expansion base units via their respective wireless communication links;

a baseband audio processor configured to combine audio signals received via two or more of the wireless communication links;

whereby conference calling can be implemented between two or more of the cordless handsets and extension base units.

9. The cordless telephone system of claim 8, the primary base unit further comprising:

a microcontroller operably connected with the baseband audio processor, which microcontroller configures the baseband audio processor to select which audio signals from the two or more communication links are combined by the baseband audio processor.

10. A cordless telephone teleconferencing system, comprising:

a primary cordless telephone base unit, the base unit connected to a primary communications network, the base unit implementing a wireless communication protocol capable of supporting simultaneous communications via a plurality of wireless communication channels;

one or more cordless telephone handsets, each cordless telephone handset having a wireless communication link with the primary base unit implemented using the wireless communication protocol;

one or more expansion base units, the expansion base units each comprising an expansion communication interface linking the expansion base unit to a respective external communication network, and a respective wireless communication link with the primary base unit using the wireless communication protocol;

wherein one or more users of the one or more cordless handsets can conduct a teleconference call simultaneously over the primary communications network and the external communications network.

11. The cordless telephone teleconferencing system of claim 10, wherein the primary communications network is a PSTN network.

12. The cordless telephone teleconferencing system of claim 10, wherein each respective external communications network is one of a PSTN network;

an ISDN network;

a cellular telecommunications network;

a local area network; and a wireless data network.

13. The cordless telephone teleconferencing system of claim 10, wherein the wireless communications protocol is a DECT protocol.

14. The cordless telephone teleconferencing system of claim 10, further comprising a baseband audio processor configured to combine audio signals received via two or more of the wireless communication links.

15. The cordless telephone teleconferencing system of claim 14, wherein the baseband audio processor mixes signals received from multiple cordless handset users and external users, the external users linked respectively to the primary base unit over the primary communications network and a plurality of external communications channels.

* * * * *